US007162467B2

(12) United States Patent
Eshleman et al.

(10) Patent No.: US 7,162,467 B2
(45) Date of Patent: Jan. 9, 2007

(54) SYSTEMS AND METHODS FOR MANAGING DISTRIBUTED DATABASE RESOURCES

(75) Inventors: John Eshleman, McLean, VA (US); Clifford W. Johnson, Reston, VA (US); Luke Lonergan, Fairfax Station, VA (US)

(73) Assignee: Greenplum, Inc., San Mateo, CA (US)

( * ) Notice: Subject to any disclaimer, the term of this patent is extended or adjusted under 35 U.S.C. 154(b) by 993 days.

(21) Appl. No.: 10/078,447

(22) Filed: Feb. 21, 2002

(65) Prior Publication Data

US 2002/0116457 A1    Aug. 22, 2002

Related U.S. Application Data

(60) Provisional application No. 60/270,126, filed on Feb. 22, 2001.

(51) Int. Cl.
   *G06F 7/00*    (2006.01)
   *G06F 17/30*   (2006.01)
   *G06F 15/16*   (2006.01)

(52) U.S. Cl. ................. 707/3; 707/10; 707/200; 709/203

(58) Field of Classification Search ............... 707/3, 707/10, 200; 709/203
   See application file for complete search history.

(56) References Cited

U.S. PATENT DOCUMENTS

| | | | |
|---|---|---|---|
| 5,551,046 A * | 8/1996 | Mohan et al. ................ | 707/8 |
| 6,081,518 A * | 6/2000 | Bowman-Amuah ......... | 370/352 |
| 6,161,139 A | 12/2000 | Win et al. | |
| 6,219,675 B1 | 4/2001 | Pal et al. | |
| 6,718,535 B1 * | 4/2004 | Underwood ................ | 717/101 |
| 6,845,503 B1 * | 1/2005 | Carlson et al. ............ | 717/166 |
| 2002/0073167 A1 * | 6/2002 | Powell et al. ............... | 709/217 |

OTHER PUBLICATIONS

Julie Basu, "Associative Caching In Client-Server Databases," Ph. D. Dissertation, Stanford University, Mar. 1998.
Hal Berenson et al., "A Critique Of ANSI SQL Isolation Levels," ACM 0-8971-731-6/95/0005, 1995.
Antonin Guttman, "R-Trees A Dynamic Indexing Structure For Spatial Searching," Proceedings of the ACM SIGMOD International Conference on Management of Data, pp. 47-57, Jun. 1984.
Stefano Ceri et al., "Deriving Production Rules For Incremental View Maintenance," Proceedings of the 17th International Conference on Very Large Data Bases, Barcelona, Spain, Sep. 1991.
Ashish Gupta et al., "Maintenance Of Materializaed Views: Problems, Techniques, And Applications," IEEE Data Engineering Bulletin, vol. 18, No. 2, Jun. 1995.

* cited by examiner

*Primary Examiner*—John Cottingham
*Assistant Examiner*—Kuen S. Lu
(74) *Attorney, Agent, or Firm*—Barnes & Thornburg LLP

(57) ABSTRACT

A system and method are described for implementing a distributed database caching system with the capability to support and accelerate read and update transactions to and from one or more central Database Management System (DBMS) servers for multiple concurrent users. The system and method include a resource abstraction layer in a database client driver in communication with remote server units (RSUs) having a cache database. RSUs respond to user requests using the cache database if possible. If the cache database does not have the needed data, the RSU sends the request to a database subscription manager (DSM) in communication with the DBMS server. The DSM responds to the request and sends predicate data based on queries processed by the DBMS server for use in updating the cache databases.

16 Claims, 9 Drawing Sheets

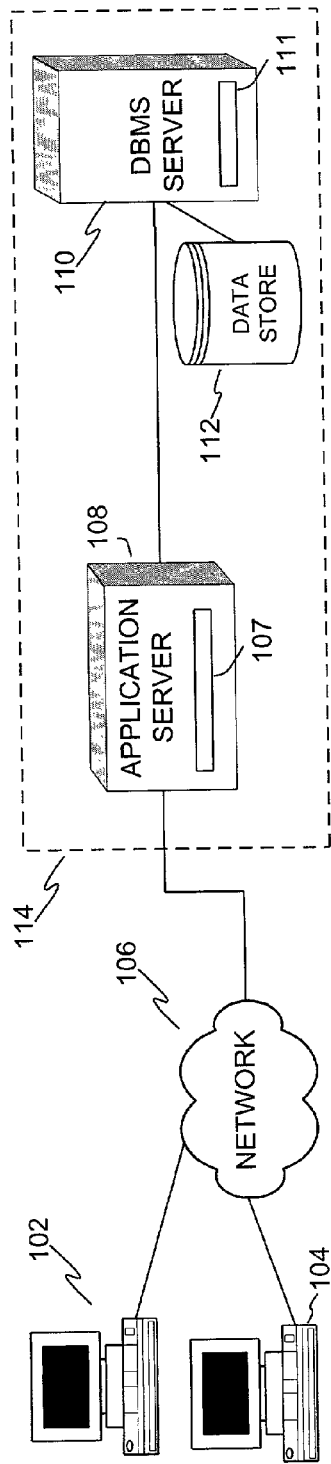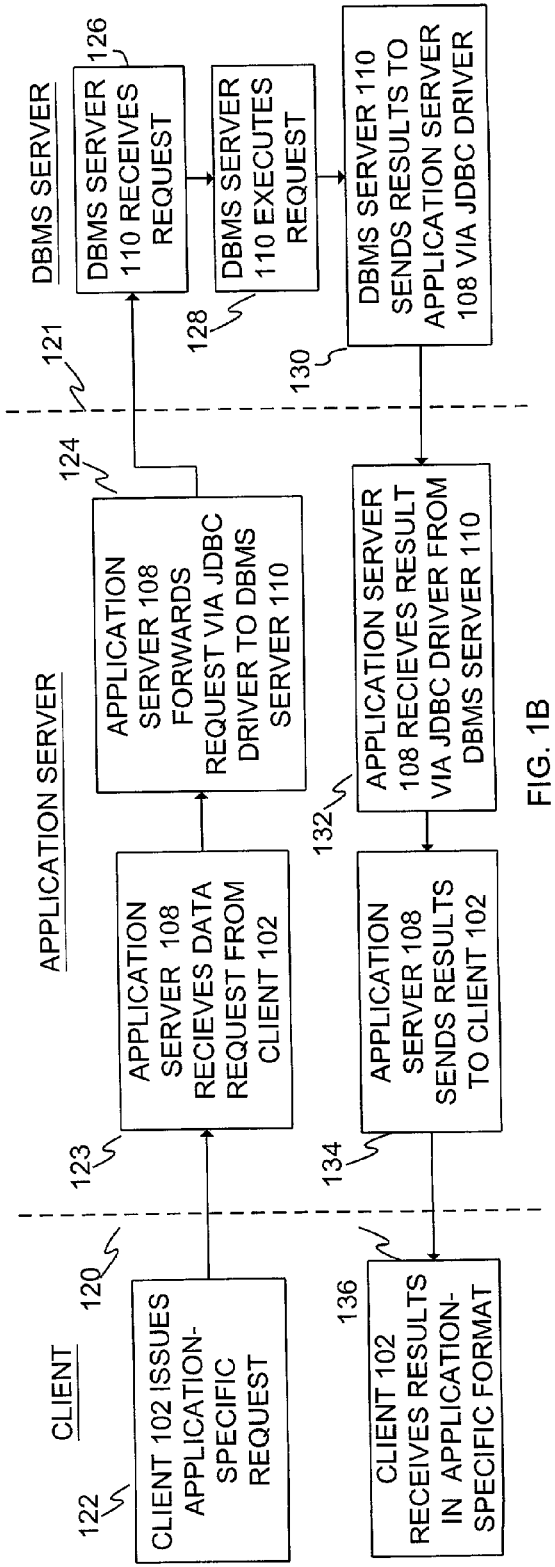

SYSTEMS AND METHODS FOR MANAGING DISTRIBUTED DATABASE RESOURCES

BACKGROUND

This application claims the benefit of U.S. Provisional Application No. 60/270,126, filed Feb. 22, 2001, which is herein incorporated by reference in its entirety.

FIELD OF THE INVENTION

The present invention relates generally to relational database management systems and applications using such systems. More particularly the present invention relates to improved performance, redundancy and capacity of distributed database systems and applications.

BACKGROUND OF THE INVENTION

Conventional client/server distributed systems provide a centralized data storage and access facility, also referred to herein as a database management system ("DBMS"), for managing information in response to data queries and update transactions. As used herein, the terms "data query" or "query" mean read-only requests for data and the terms "update transaction" or "transaction" mean any read-write operations involving changes to the data stored in the database. A conventional client/server system is shown in FIG. 1A. Client systems 102 and 104 are connected to network 106, which is connected to application server 108. Clients 102 and 104 have client software for interfacing with server software on application server 108. The client software could be any software application or module providing a user interface for issuing data queries or update transactions, such as for example, DBMS-specific client applications or more generally a Web browser application. Similarly, the server software could be a software application provided specifically for processing users' database requests or could be an application capable of providing more generalized services, such as a web server.

Application server 108 is connected to DBMS server 110, which has data store 112. DBMS server 110 has DBMS software for managing data in data store 112. DBMS software is available from many vendors, for example, Oracle Corp. of Redmond Shores, Calif., Sybase Inc. of Dublin, Calif., and International Business Machines Corp. of Armonk, N.Y., among others. As known in the art, application server 108 and DMBS server 110 could be the same computer system or different computer systems, as shown in FIG. 1A. Moreover, servers 108 and 110 could be in the same facility 114, as shown in FIG. 1A, or they could be located in physically separated facilities.

A problem with such centralized DBMSs is the limited capacity for handling a very large number of data queries or transactions. By increasing the computing power of the computer host serving the DBMS one can improve the DBMS's capacity. However, even with enormous capital investments in advanced hardware, a company will see limited returns in terms of increased DBMS capacity. For example, a conventional DBMS, such as an Oracle™ database running on a Sun Enterprise™ E450 server, from Sun Microsystems, Inc. of Palo Alto Calif., can typically processes 20,000 transactions per minute. (Transaction Processing Council TPC-C Benchmark Results can be obtained from www.tpc.org). Replacing the server with a Sun Enterprise™ E4500 server, also from Sun Microsystems, at a cost of about $2,500,000 (2001 dollars), the database should be able to process 50,000 transactions per minute. Still greater improvements can be gained if the server is replaced with a Sun Enterprise™ E10000 server, from Sun Microsystems, at a cost of about $12,000,000. In this case, the DBMS processing should be able to process 115,000 transactions per minute. As can be seen from this example, the relationship of server cost to DBMS capacity is not linear, but rather is an exponential curve.

In an attempt to provide increased capacity, some conventional client/server applications have implemented replicated DBMS systems. In such systems, multiple DBMS servers and data stores are use used to process user data queries and update transactions. An example of a simple replicated DBMS system is shown in FIG. 2. With database replication, a single DBMS can be split into two or more participating systems. Each system handles a portion of the stored data as the "primary" resource, while others also store the data as a "secondary" resource. This provides both fault-tolerance (because of the duplicated data storage) and load balancing (because of the multiple resources for queries and updates).

FIG. 2 shows three client systems 202, 204 and 206 connected to network 208. These client systems send data queries and update transactions to application server 210, also connected to network 208. Application server 210 is connected to DBMS servers 212 and 214 via load balancer 216 and switch 218 as shown in FIG. 2. DBMS 212 has a primary database in data store 220A and a secondary database in data store 220B. Similarly, DBMS 214 has a primary database in 222A and a secondary database in data store 222B. In many replicated DBMS systems, such as shown in FIG. 2, the primary database served by one DBMS server is a secondary database served by a different server. For example, the database on data store 220A is a replica of the database on data store 222B, and the database on data store 220B is a replica of the database on data store 222A. In this manner, both DBMS servers 212 and 214 can accommodate user requests thereby providing increased capacity. When application server 210 receives a user request, it passes the request on to load balancer 216. Load balancer 216 tracks the performance and loading of DBMS server 212 and 214 to determine which server should be assigned the request. Switch 218 provides increased communications bandwidth by separating the traffic according to the server designated to receive the request from load balancer 216.

Database replication has been an attractive technology for businesses that need increased reliability of database access (redundancy) or increased capacity beyond that available in one machine or locality (scalability). Although the concept of splitting the DBMS across multiple systems is simple, implementation has proved to be very complex. This complexity is realized in the form of additional systems management and programming effort. Even with this increased investment and complexity, it is widely known by system architects that most DBMS system cannot adequately be scaled beyond two coupled systems. For these reasons, most data center managers have been reluctant to commit to database replication projects without factoring significant development and risk costs into their projects. Accordingly, database replication has enjoyed only a limited degree of success, despite significant investments by DBMS manufactures and decades of aggressive competition. A simpler and more powerful approach is necessary to enable widespread access to database resources without incurring significantly more cost, risk and complexity than a single DBMS system.

The data flow in conventional DBMS systems generally follows the steps shown in FIG. 1B. FIG. 1B shows the steps carried out during a simple database query by client 102. As would be apparent to those skilled in the art, additional steps may be necessary for more complex queries or for database update transactions. In any event, the basic communication flow across boundary 120 (i.e., between client 102 and application server 108) and across boundary 121 (i.e., between application server 108 and DBMS server 110) is representative of all conventional DBMS systems. Boundaries 120 and 121 are included to delineate the different software applications operating within the DBMS system shown in FIG. 1A.

In step 122, client 102 issues an application-specific request to application server 108. In step 123, application server 108 receives the request from client 102 and in step 124, application server 108 forwards the request to DBMS server 110 via a conventional client application programming interface (API) 107. In the present example, client API 107 is a Java database connectivity (JDBC) client driver. As known in the art, APIs are language and message formats or protocols used by one application program to communicate with another program that provides services for it. APIs allow application programs to be written according to a defined standard thereby simplifying the communications between applications. Another API commonly used for database systems is the open database connectivity driver (ODBC).

In step 126 DBMS server 110 receives the request from application server 108 via server API 111, which may be for example, a JDBC server driver. In step 128, DBMS server 110 executes the database query to retrieve results requested by the client. In step 130 DBMS server 110 sends the results back to application server 108 via server API 111 (e.g., a JDBC server driver). In step 132, application server 108 receives the results via client API 107 (e.g., a JDBC client driver). In step 134, application server 108 formats the results and sends them to client 102. Finally, in step 136, client 102 receives the results requested.

SUMMARY OF THE INVENTION

The present invention provides a system and method to transparently distribute DBMS resources across multiple platforms and multiple data servers, making them broadly accessible by dispersed users developers over networks such as the Internet. The present invention extends a centralized DBMS system by adding a Resource Abstraction Layer (RAL) to a conventional database driver normally used to access a DBMS. The RAL implements DBMS resources that mirror the functionality of a centralized DBMS, but may be physically located at different networked locations. The RAL allows a plurality of remote server units (RSUs), implemented throughout the network, which receive and respond to data requests in place of the DBMS server. Each RSU maintains a database cache of recently accessed data from which incoming requests may be satisfied and can process database requests on behalf of the DBMS server. The DBMS server is contacted only if the RSU cannot respond to the request with cached data. In this case, the DBMS server processes the request as if it had been received directly from the application server. Once the DBMS server has retrieved the results of the request, it sends them back to the RSU. The RSU provides the results to the application server and stores the data in the database cache for use with future requests.

Using the present invention, distributed DBMS resources can be allocated using policies implemented within the RAL. For example an RAL may distribute data requests according to geographic location, priority, time-of-day and server load. The RAL maps distribution policies to physically distributed DBMS resources (RSUs) by managing data structures that represent the state of available RSU resources. Accordingly, the present invention replaces what would normally be a singular resource with one that conforms to the policy. Policies may be entered or changed while the systems are running.

The present invention provides application developers with the important feature of transparency of the underlying database architecture. That is, an application program can take advantage of the benefits of load balancing and fault tolerance without the necessity for architecture-specific software coding.

It is an object of the present invention is to extend the functionality of centralized database applications to the edge of the Internet, increasing quality while reducing costs.

It is another object of the present invention to expand the capacity of database resources without risk of losing quality or availability when more users or new geographic locations are added.

It is another object of the present invention to transparently extend a centralized DBMS server providing fault tolerance and load balancing benefits without the need for specialized programming or knowledge of the underlying network architecture by users and developers.

These and other objects of the present invention are described in greater detail in the detailed description of the invention, the appended drawings and the attached claims.

DESCRIPTION OF THE DRAWINGS

FIG. 1A is a schematic diagram of a simple client/server distributed data system according to the known art.

FIG. 1B is a flow diagram showing the steps used in a conventional client/server distributed data system as shown in FIG. 1A.

DETAILED DESCRIPTION OF THE INVENTION

Figure 2:
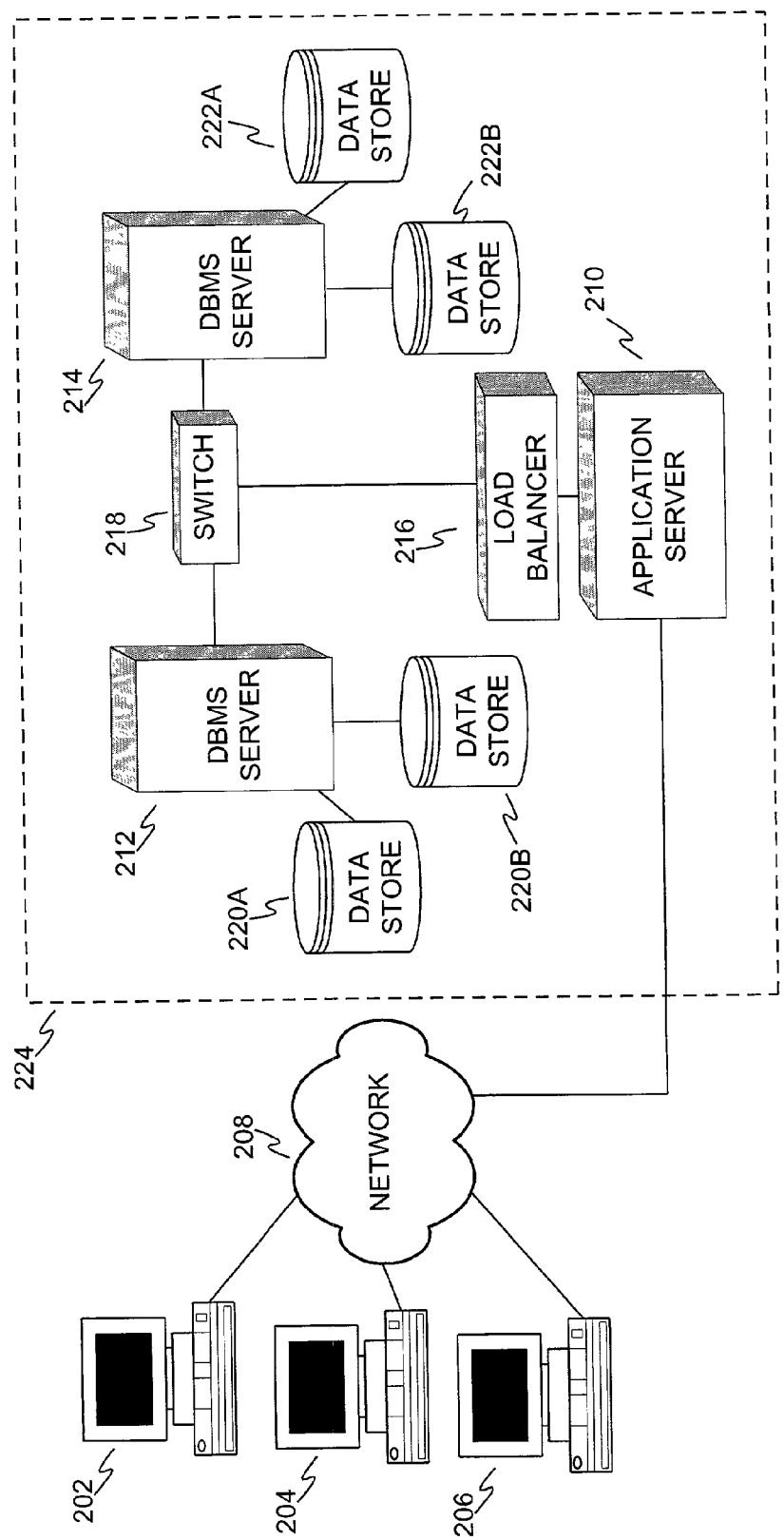
FIG. 2 is a schematic diagram of a complex client/server distributed data system using a replicated database according to the known art.
Figure 3A:
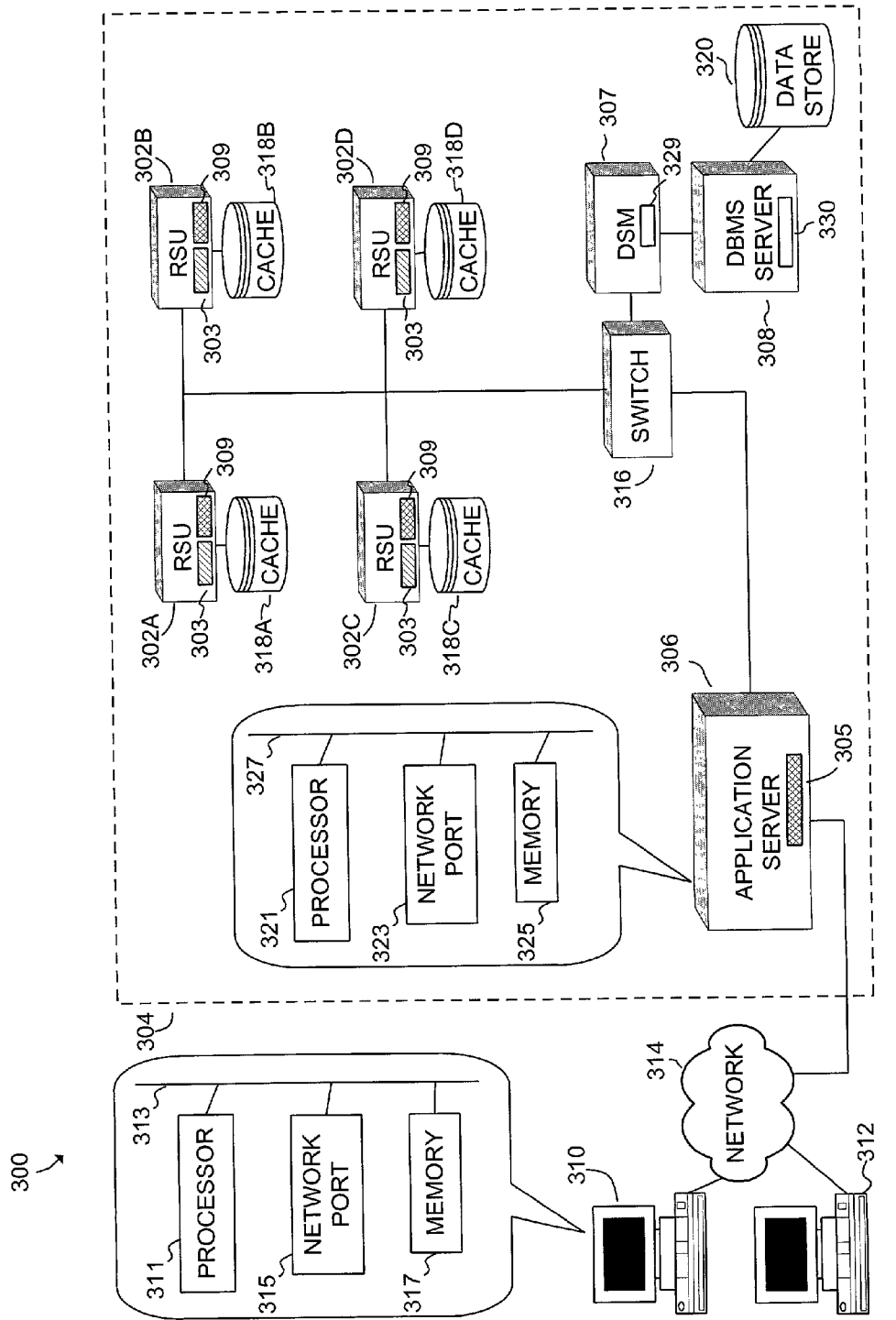
FIG. 3A is a schematic diagram of a client/server distributed data system according to an embodiment of the present invention.

FIG. 3A is a schematic diagram of an embodiment of the present invention.

System 300, in an embodiment, includes a computer 310 of a user. Computer 310 can include a processor 311 coupled via bus 313 to network port 315 and memory 317. Processor 311 can be, for example, an Intel Pentium® 4 processor, manufactured by Intel Corp. of Santa Clara, Calif. As another example, processor 311 can be an Application Specific Integrated Circuit (ASIC). An example of bus 313 is a peripheral component interconnect ("PCI") local bus, which is a high performance bus for interconnecting chips (e.g., motherboard chips, mainboard chips, etc.), expansion boards, processor/memory subsystems, and so on.

Network port 315 can be an Ethernet port, a serial port, a parallel port, a Universal Serial Bus ("USB") port, an Institute of Electrical and Electronics Engineers, Inc. ("IEEE") 1394 port, a Small Computer Systems Interface ("SCSI") port, a Personal Computer Memory Card International Association ("PCMCIA") port, and so on. Memory 317 of computer 310 can store a plurality of instructions configured to be executed by processor 311. Memory 317 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof.

Computer 310 can be coupled to server application 306 via network 314. Server 306 can be, for example, a Windows NT server from Hewlett-Packard Company of Palo Alto, Calif., a UNIX server from Sun Microsystems, Inc. of Palo Alto, Calif., and so on. Server 306 can include a processor 321 coupled via bus 323 to network port 325 and memory 327. Examples of network 314 include a Wide Area Network (WAN), a Local Area Network (LAN), the Internet, a wireless network, a wired network, a connection-oriented network, a packet network, an Internet Protocol (IP) network, or a combination thereof. Memory 327 includes modified API 305 that intercepts database calls and routes them to one of the remote server units (RSU) as described below.

System 300 in FIG. 3A also includes a plurality of RSUs 302A–302D, database subscription manager (DSM) 307 and DBMS server 308. The RSUs, DSM and DBMS server each can include processors, network ports and memory as described above.

As used to describe embodiments of the present invention, the terms "coupled" or "connected" encompass a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

FIG. 3A illustrates a first embodiment of the present invention, wherein a plurality of remote server units (RSU) 302A–302D are housed within data center 304 together with application server 306 and DBMS server 308. Client systems 310 and 312 send data queries or update transactions to application server 306 via network 314. Application server 314 processes the clients' requests and forwards them to DBMS sever 308 via a client API as described above. Unlike the conventional system describe above, in this embodiment of the present invention, modified API 305 is used to redirect communications to and from DBMS server 308 to one of RSUs 302A–302D using the resource abstraction layer (RAL) employed within modified API 305 (e.g., a modified JDBC driver). An RSU is selected to satisfy the database resource request, as appropriate to satisfy the policy operational in the RAL at the time of the request. Switch 316, shown in FIG. 3A between RSUs 302 and DBMS server 308 is used to isolate traffic on the network within data center 304. As known in the art, use of the switch is not necessary but improves overall performance of the DBMS system of the present invention.

Each RSU has a corresponding database cache 318A–318D storing recently accessed data from which incoming requests may be satisfied. Furthermore, each RSU includes modified server API 303 and modified client API 309. When an RSU receives the request from application server 306, it checks its database cache to determine if the request can be satisfied without input from DBMS server 308. If the cache contains the requested information, the RSU returns the results to application server 306 via modified client API 305. In this manner, applications on application server 306 are insulated from the database architecture created using the present invention. That is, the server software on application server 306 need not have any awareness of the existence of the RSUs. Accordingly, the present invention may be used with any database application program without the need for rewriting the computer code. If the cache does not have the data needed to satisfy the request, the RSU forwards the request on to DBMS server

308 via database subscription manager (DSM) 307 as described below. DBMS server 308 processes the request as if it had been received directly from the server. DBMS server 308 retrieves the results of the request from data store 320 and sends the data back to the RSU via DSM 307. The RSU stores the data in the database cache for use with future requests and provides the result to application server 306 for further processing of the client's requests.

Figure 3B:
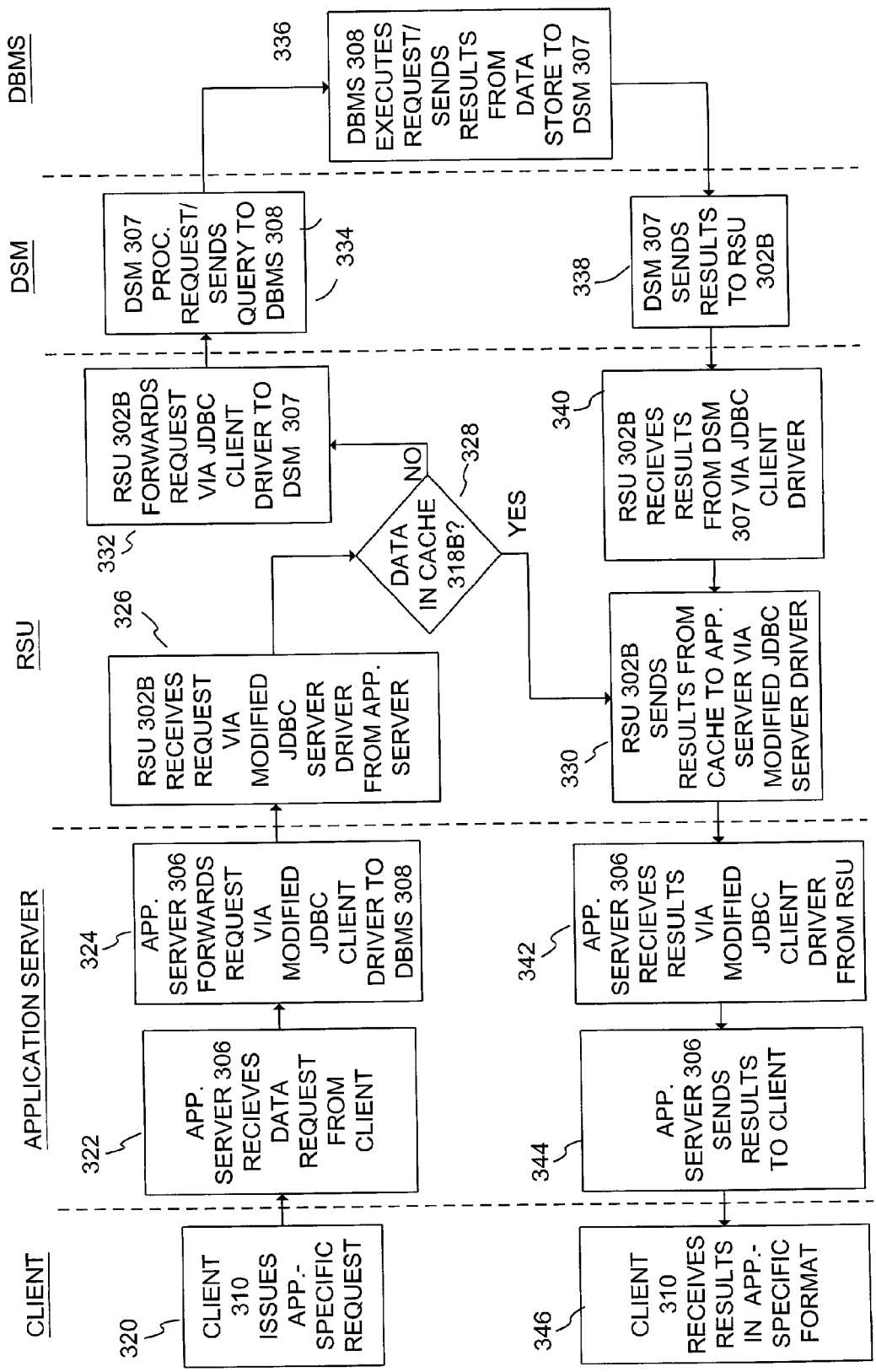
FIG. 3B is a flow diagram showing the steps used in the client/server distributed data system for the embodiment of the present invention as shown in FIG. 3A.

FIG. 3B is a data flow diagram for typical data queries in the embodiment of the present invention shown in FIG. 3A. As would be apparent to those skilled in the art, other steps may be necessary for update transactions. In step 320, client system 310 issues an application specific request to application server 306. In step 322, application server 306 receives the request from client 310 and in step 324, application server 306 forwards the request to DBMS server 308 via modified API 305. In the present example, modified API 305 is a modified JDBC client driver installed on application server 306. Although application logic on application server 306 addresses the request to DBMS server 308, modified JDBC client driver 305 re-routes the request to one of the RSUs 302A–302D. In the present example, the request is re-routed to RSU 302B. Accordingly, in step 326, RSU 302B receives the request from application server 108 via modified JDBC server driver 303 on RSU 302B. In step 328, RSU 302B checks its database cache 318B to see if the request can be satisfied without assistance from DBMS server 308. If the request can be satisfied using cache 318B, the RSU sends the results back to application server 306 via modified JDBC server driver 303 in step 330. Otherwise, in step 332 a cache database management system (CDBMS) process on RSU 302B sends the query on to database subscription manager (DSM) 307. The request is sent via modified JDBC client driver 309 on RSU 320B. DSM 307 processes the request and sends a query to DBMS 308 via conventional JDBC client driver 329 in step 334. In step 336 DBMS server 308 executes the database query to retrieve the results requested by client 310 and sends the results back to DSM 307. In step 338, DSM 307 sends the results back to RSU 302B. In step 340, RSU 302B receives the results from DSM 307 via modified JDBC client driver 309 and stores the data in its cache database 318B. After storing the information in the cache, the RSU sends the results to application server 306 in step 330. This communication is processed via modified JDBC server driver 303 on RSU 302B and modified JDBC client driver 305 on application server 306. In steps 342 and 344, application server 306 receives the results from RSU 302B and sends them on to client 310. In step 346, client 310 receives the results for the request from application server 306.

Figure 4:
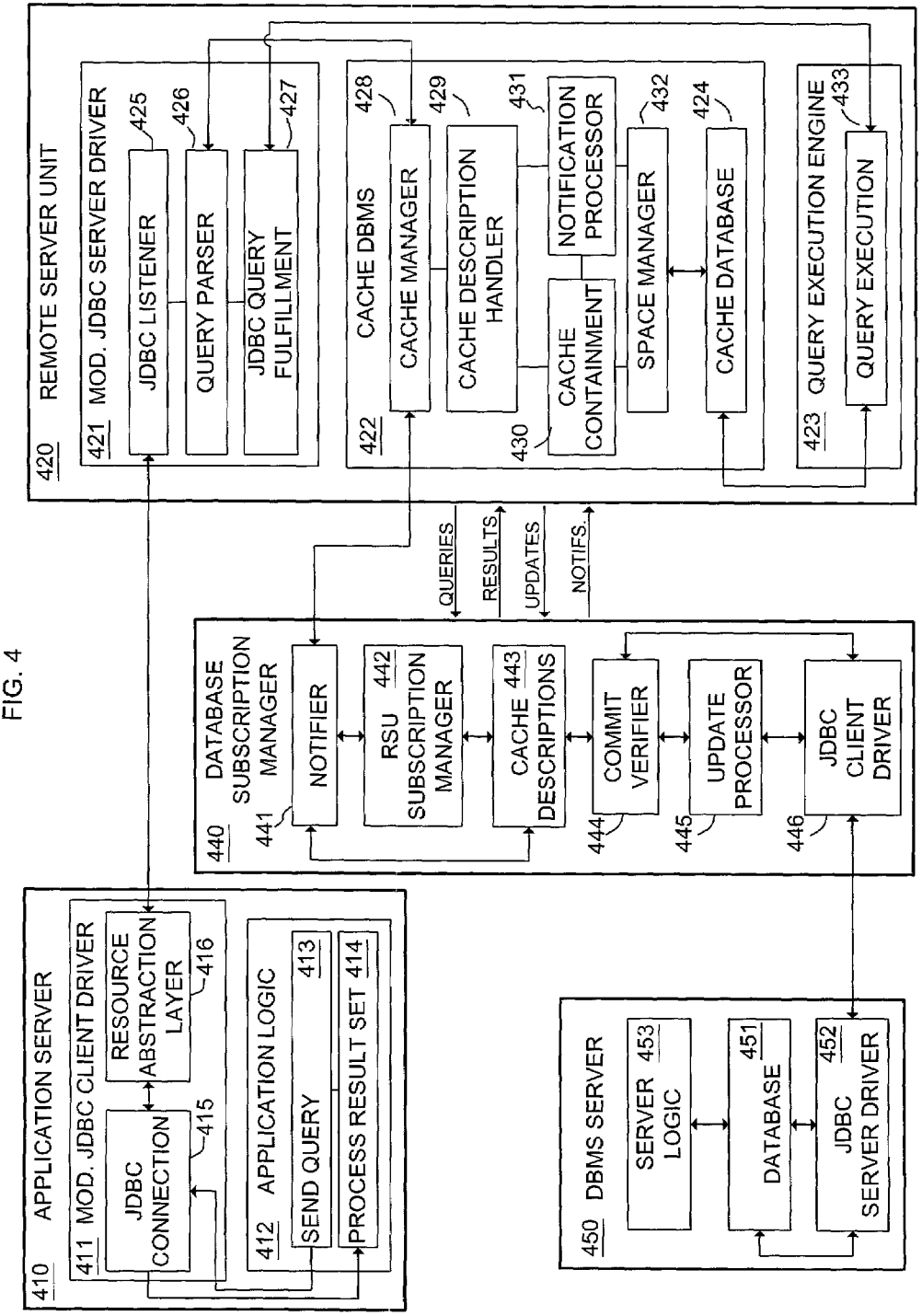
FIG. 4 is a block diagram of the software architecture used in an embodiment of the present invention.

FIG. 4 is a block diagram showing the components of a DBMS system according to an embodiment of the present invention. This system comprises application server 410, remote server unit 420, database subscription manager 440 and DBMS server 450. As shown in FIG. 4, application server 410 comprises modified JDBC client driver 411 and server application logic 412. Application logic 412 comprises conventional programming logic such as send query module 413 and process result set 414.

Modified JDBC client driver 411 is a programming module comprising native Java JDBC API functionality, including, for example, JDBC connection module 415. Modified JDBC client driver 411 is installed by the application server system administrator in place of other database vendor provided JDBC drivers. In a preferred embodiment, modified JDBC client driver follows conventional installation semantics such as provided by database vendors such as Oracle, Sybase, WebLogic, and WebSphere. As shown in FIG. 4, application logic 412 interfaces with JDBC client driver 411. In particular, send query module 413 provides input to JDBC connection module 415 and process result set 414 receives responses sent from JDBC connection module 415.

In addition to the conventional functionality described above, modified JDBC client driver 411 comprises new functionality via resource abstraction layer (RAL) 416. RAL 416 translates API calls into network protocol encapsulated RSU requests. As shown in FIG. 4, RAL 416 interfaces with JDBC connection module 415 to send and receive database requests for processing on RSU 420. RAL 416 includes programming logic for identifying an appropriate RSU to fulfill any data requests or update transactions received by application server 410 from a client application. RAL 416 pools RSUs according to database or application server administrator-derived policies. Such allocation policies may include, for example, a stateful priority queue with multiple access, round robin using low priority RSUs, or geographical (e.g., server name or IP domain name) allocation. Additionally, RAL 416 could use all allocation policies simultaneously to maximize efficient resource allocation or increase service level guarantees for designated application servers. After determining which RSU should receive the database request, RAL 416 sends the request to the RSU for further processing.

As shown in FIG. 4, RSU 420 comprises modified JDBC server driver 421, cache DBMS 422 and query execution engine 423. These three modules act together to receive and process database requests on behalf of DBMS server 450. As described previously, RSU 420 will attempt to respond to any database requests using only the information stored in its cache database 424. If the request cannot be satisfied, cache DBMS 422 sends the request on to DMS 440 for further processing. Cache database 424 is physically resident on a local data store, such as random access memory or an optical or magnetic data storage device, on RSU 420.

Modified JDBC server driver 421 comprises three functions, JDBC listener 425, query parser 426 and JDBC query fulfillment 427. Each function 425–427 could be integrated into a single module, or could be three separate modules as shown in FIG. 4. JDBC listener 425 receives database requests from modified JDBC client driver 411 on application server 410. The requests are passed to query parser 426 and parsed into structured query language (SQL) queries which can be further processed by JDBC query fulfillment function 427. JDBC query fulfillment function 427 interacts with query execution function 428 on query execution engine 423 as shown in FIG. 4.

Cache DBMS 422 performs various functions related to management of cache database 424. The structure and function of cache DBMS 422 is described in full detail in J. Basu, "Associative Caching in Client-Server Databases," *Ph.D. Dissertation submitted to Stanford University*, Stanford, Calif., March. 1998 (Basu), which is herein incorporated by reference in its entirety and of which relevant portions are included or described herein. Cache DBMS 422 implements the client side of A*Cache described in Basu, and extends its functionality to address usage by multiple simultaneous requesters and transactions. Cache DBMS 422 comprises cache manager 428, cache description handler 429, cache containment 430, notification processor 431, cache space manager 432 and cache database 424. Generally, cache DBMS 422 manages the cached data and acquires required data from DBMS server 450 by interfacing with DSM 440. Cache manager 428 interfaces with query parser 426 on JDBC server driver 421 to determine whether or not the query can be satisfied from cache database 424. Cache manager 428 analyzes the query and informs JDBC server driver 421 whether query completion requires local or non-local data for fulfillment. JDBC query fulfillment 427 uses this information to execute a query in conjunction with query execution function 428 on query execution engine 423. The functions of cache DBMS 422 are described in more detail below.

Cache manager 428 determines the type of database operation received from application server 410 and serves as the controller component of cache DBMS 422. For example, cache manager 428 manages and processes database-specific instructions such as commit, abort, rollback, savepoint, and the like. Cache manager 428 also identifies and calls either local or remote resources to fulfill requests as necessary. Cache manager 428 includes further functionality such as command parsing and dispatching and participates in the commit verification algorithm used to keep the local cache database 424 and the non-local database on DBMS server 450 up-to-date. In a preferred embodiment, a semi-optimistic concurrency control scheme such as described in Basu at section 3.3.3 is implemented in cache manager 428. In that section, Basu describes such a scheme as minimizing unnecessary aborts of transactions while reducing communication with the server. In this scheme if data is locally available in cache database 424, cache manager 428 optimistically assumes that the data is up-to-date. However, when the data is not available in cache database 424, a conventional two-phase locking is implemented on DSM 440 during the processing by DSM 440 and DBMS server 450.

Cache description handler 429 inserts and deletes predicates into the cache description and keeps track of usage information for predicates for space management purposes as described in Basu at section 4.1. As noted in that section, modifications to cache descriptions may be needed: (1) when a new query is stored in cache database 424, (2) when a previously cached result is purged from cache database 424, and (3) during processing of update notifications.

Cache containment 430 determines whether a query is completely or partially contained in the cache and is invoked when either: a new query is submitted by application server 410 or a new notification message arrives from DSM 440. In this manner cache containment 430 insures that cache contents affected by a transaction are updated as needed. The function provided by cache containment 430 requires the use of an algorithm for determining the mapping of query predicate indexes into the predicate regions currently contained in the cache description. There are many algorithms in common usage that provide this functionality, including multidimensional indexing using R-tree as described by A. Guttman, "R-Trees: A dynamic index structure for spatial searching", *Proceedings of the ACM SIGMOD International Conference on Management of Data*, pages 47–57, June 1984 which is herein incorporated by reference in its entirety.

Cache manager 428 uses methods that extend those described in Basu to handle multiple simultaneous users and transactions. When query parser 426 decodes a request to open a transaction, depending on the user's choice of transaction consistency level (Case-A, Case-B, Case-C, described below) it may send an "open transaction" message to DSM 440, which will in turn open a transaction on DBMS 450, hereafter referred to as the "remote transaction". A transaction will also be opened on cache database 424 by cache manager 428, hereafter referred to as the "local transaction". Depending on the case, the remote transaction can then used for the duration of the user's transaction to ensure that data read and written to and from the DBMS 450 and RSU 420 during the user's transaction will be consistent with the time on DBMS 450 at the beginning of the remote transaction. The local transaction ensures that data read and written to and from cache database 424 are consistent with the time at the beginning of the local transaction. Depending on the type of transaction opened by the user, different transaction isolation levels are implemented by using the local and remote transactions as described below for three cases of interest. Each case refers to a transaction isolation level where definitions of isolation levels are taken from H. Berenson, et al., "A Critique of ANSI SQL Isolation Levels", ACM 0-89791-731-6/95/0005, 1995, which is herein incorporated by reference in its entirety.

Notification processor 431 handles notification messages from DSM 440 and propagates the effect of the notification to cache database 424. Notification processor 431 initially calls cache containment 430 to find out whether cache contents are affected by the notice. Cache containment 430 analyzes the notification and determines which of three possible outcomes results. First, there may be no affect on either cache database 424 or the current transaction (if one is outstanding). Next, the notification may affect only cache database 424 and not the current transaction. Finally, both cache database 424 and the current transaction may require updates as a result of the notification. In a preferred embodiment, the cache update action depends on the cache maintenance policy and the contents of the notification as described in Basu at sections 3.3.4 and 3.3.3. That is, the cache maintenance policy may include, for example, (1) automatically refreshing the cache upon receipt of a notification, (2) refreshing upon demand by a subsequent query, (3) invalidating cached data and predicates upon notification, and (4) automatically expiring cached predicated based on the age of the predicates. Notification message may include, for example, (1) only primary keys or identifiers associated with updated data; (2) the updated data itself, (3) only update commands, or (4) not only the updated data and the update commands, but other auxiliary information used to refresh the cache.

Space manager 432 controls the storage of new query results in cache database 424. As noted above, cache database 424 resides in a local data store (memory/disk) on RSU 420. Space manager 432 controls the storage space and implements a cache replacement policy when the local data store is full. The cache replacement policy dictates how to purge query results in cache database 424. In a preferred embodiment, the replacement policy is implemented using a predicate-based algorithm and a reference counting scheme for data items as described in Basu at section 3.3.6. For example, a cost-benefit analysis may be implemented in which the expected benefit of caching a predicate may be determined based on factors such as the frequency of usage of the predicate, the cost of accessing the predicate if retrieved from DBMS server 450, the cost of accessing the predicate on the cache database, and the like. A ranking factor may be assigned to each predicate based on the ratio of the expected benefit to the size of the predicate. Space manager 432 may use such a ranking system as a threshold for determining which predicates to keep in the cache. Space manager 432 also decides whether to cache a new query result in cache database 424.

Query execution engine 423 includes query execution function 433 which processes ANSI SQL92 queries and returns a result set. Query execution function 433 operates solely on data stored in cache database 424. Results are returned to JDBC server driver 421 via JDBC query fulfillment function 427 in the form of a navigable result set. Query execution function 433 may be implemented using a lightweight standalone Java DBMS, such as IDB, available from Lutris, Inc. of the United Kingdom. Query execution function 433 is responsible for data retrieval and update operations on cache database 424 and is activated when there is a cache hit, in response to an update notification, or when reclaiming space from the cache. Finally, query execution function 433 provides rollback and abort functionality for local updates.

Database subscription manager (DSM) 440 comprises notifier 441, RSU subscription manager 442, cache descriptions 443, commit verifier 444, update processor 445 and JDBC client driver 446. DSM 440 manages subscriptions for all RSUs in the system. DSM 440 may reside either on a dedicated resource, for example, a standalone computer as shown in FIG. 3, or may reside on any one of RSU 302A–302D or other servers on the network. As described above, notifier 441 sends and receives messages from cache DBMS 422. RSU subscription manager 442 manages the set of predicates cached by each RSU, this set of predicates is herein defined as a "subscription." RSU subscription manager 442 interfaces with cache descriptions 443. To keep an RSU's cache database up to date, RSU subscription manager 442 assumes that any queries executed at the server should be cached on the RSU. RSU subscription manager 442 maintains a subscription for each client indicating which predicates and associated data are stored in the associated cache databases. These subscriptions are updated prior to transmission of the query results to the RSU. RSU subscription manager 442 also processes the RSUs' requests for modifications to their subscriptions. In one embodiment of the present invention, this function is carried out by deleting the predicate that is then flushed from the RSU's cache.

Notifier 441 manages the update propagation system used in this embodiment of the present invention. Notifier 441 communicates with cache manager 428 as shown in FIG. 4. Notifier 441 is triggered when a transaction commits updates on DBMS server database 451 on DBMS server 453. Notifier 441 uses cache descriptions 443 as maintained by RSU subscription manager 442 to determine which clients are affected by the updates. In a preferred embodiment, methods for incremental maintenance of materialized views include those such as described by S. Ceri and J. Widom, "Deriving Production Rules for Incremental View Maintenance," *Proceedings of the 17th International Conference on Very Large Data Bases*, Barcelona, Spain, September 1991, (Ceri et al.) and A. Gupta and I. S. Mumick, "Maintenance of Materialized Views: Problems, Techniques, and Applications"; *IEEE Data Engineering Bulletin*, Vol. 18, No. 2, June 1995 (Gupta et al.), which are herein incorporated by reference in their entirety. Moreover, in a preferred embodiment of the present invention, notifier 441 implements a notification scheme following a 'liberal' policy as described in Basu at section 4.1. As described in that section, in a liberal notification scheme notifier 441 may occasionally notify an RSU of an irrelevant update, but will always notify the RSU that a cached object has changed.

Commit verifier 444 provides an enhancement of the conventional DBMS commit processes by guaranteeing serializability of transactions that evaluate queries locally at an RSU. This ensures that information used to complete a transaction is correct at the time of the commit at the DBMS. This is accomplished by interfacing with the RSU to ensure all notifications have been processed prior to completing an update function as described in Basu at section 3.3.3. For example, commit verifier 444 may use a message numbering scheme, in which each notification message is assigned a sequential number. When RSU 420 processes notification a message it sends a message back to DSM 440 informing the DSM of the sequence number of the last notification message it processed. Commit verifier 444 on DSM 440 compares this value to an internal list of notification messages transmitted to determine whether or not the commit should be confirmed. Moreover, commit verifier 444 interacts with cache manager 428 on cache DBMS 422 to enforce this verification prior to processing commit requests. Commit verifier 444 also interfaces with update processor 445 to implement the update transaction on DBMS server 445.

Update processor 445 uses updates initiated on an RSU to update database 451 on DBMS server 450. Update processor 445 receives requests for update from commit verifier 441. Update processor 445 uses conventional JDBC client driver 446 on DSM 440 to interact with conventional JDBC server driver 452 on DBMS server 450. JDBC server driver 452 and database 451 interface with server logic 453 to process the update requests received from DSM 440.

In an embodiment of the present invention, the DSM update processor conservatively predicts which RSUs are affected by changed data on the DBMS, the computation of which can be a significant performance challenge. The present invention uses a novel method to quickly determine how changes on the DBMS affect the current subscriptions for a particular RSU. The method uses the following steps:

(a) A mapping of rows to subscriptions for all RSUs is maintained by the DSM by using a unique identifier for each row, such as that provided by the ROW_ID used in the Oracle™ DBMS.

(b) A mapping of subscribed predicates for all RSUs is maintained by the DSM in a data structure that allows a process to input a set of column values and receive in return the list of those predicates that contain the set of column values. A high performance data structure like Interval Skip List can be used for this purpose.

(c) When a changed row is detected by the DBMS, for example, using triggers as provided by Oracle and other commercial DBMSs, the unique row identifier is input by the DSM to the data structure described in step (a). The result is a list of RSUs that are affected by the change because they have subscribed to a predicate that contains that row. The list of affected RSUs is stored and will possibly be added to in the next step.

(d) The column values in the changed row are input to the data structure defined in step 4b. The result is a list of subscribed predicates on RSUs that are affected by the current values of the changed row. This list of affected RSUs is added to the list derived from step (c).

(e) The changed row(s) are send to the list of affected RSUs derived from steps (c) and (d), where each affected RSU identifies how the changed row affects the locally cached predicates and data.

In another embodiment of the invention, the data structure used in step (b) is simplified to only include information about which columns on each RSU are included in any of the currently cached predicates on that RSU. Step (d) is modified to provide only the list of columns that have changed in the row, instead of the column values in the row. The resulting set of matched RSUs is used for the remainder of the method. While this is a less accurate computation of the affected RSUs, it will conservatively capture the affected RSUs, and so meets the criterion necessary for the DSM update processor described in this invention.

Figure 5:
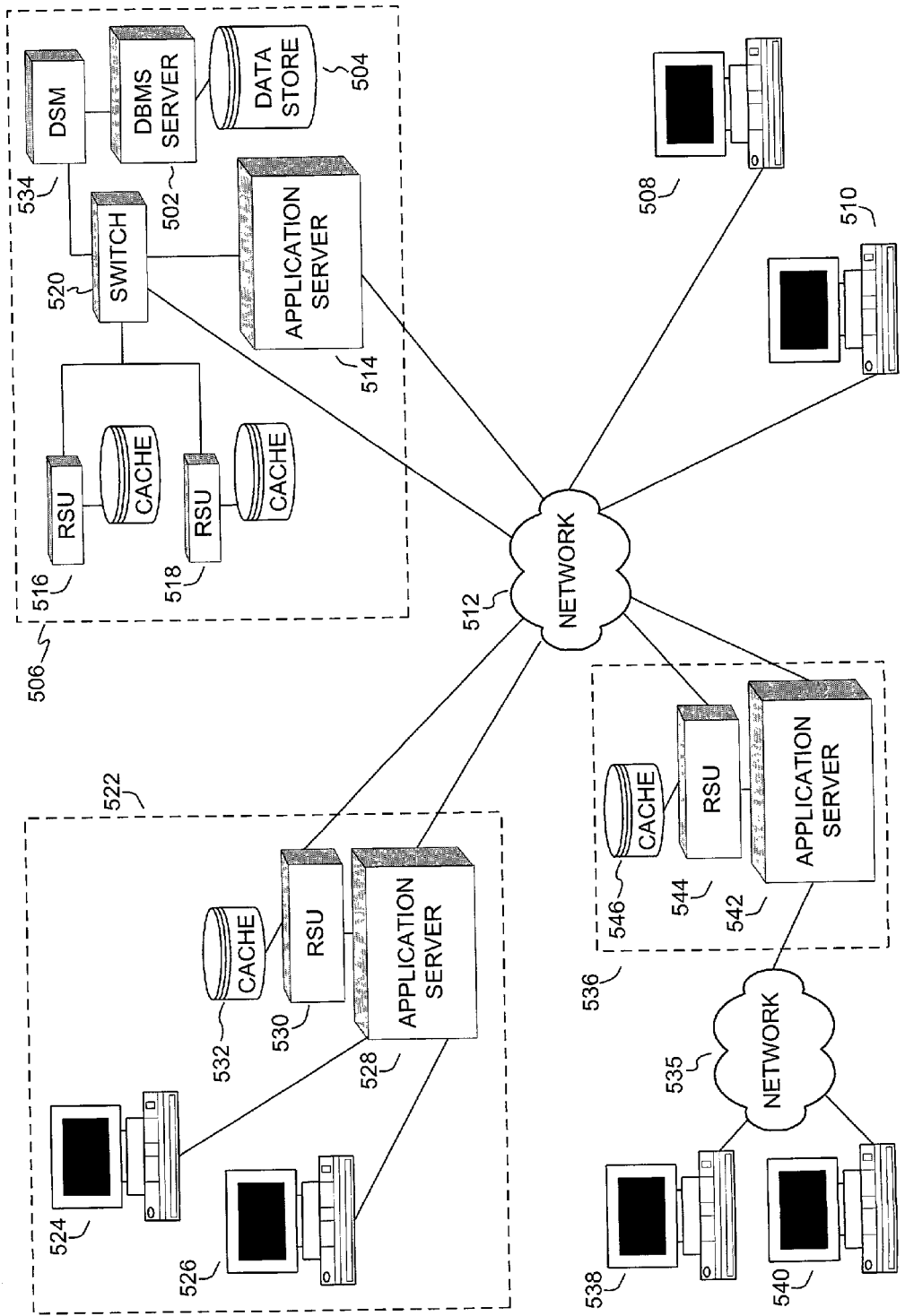
FIG. 5 is a schematic diagram of a client/server distributed data system according to another embodiment of the present invention.

The present invention advantageously allows implementation of an architecture such as shown in FIG. 5 without the need for additional programming by the application server service provider or business logic programmer. As shown in FIG. 5, multiple distributed sites and/or users can be served by DBMS server 502 and data store 504. For instance, the architecture allows centralized data processing within data center 506. That is, client systems 508 and 510, both connected to network 512 can send queries or transactions to application server 514 for processing. Application server 514 uses a modified client API of the present invention allowing it to interface with either RSU 516 or RSU 518 (via switch 520). In addition to central data center 506, the present invention allows implementation of a more localized data processing environment, such as campus data center 522.

Within campus data center 522, client systems 524 and 526 send database queries and transactions to application server 528. Application server 528 includes a modified client API as described above. A resource abstraction layer within the modified client API directs the clients' requests to RSU 530, which is local to campus data center 522. As described above, RSU 530 comprises cache database 532 from which the clients' requests will be fulfilled. If the cache does not contain the needed data, RSU 530 contacts DSM 534 to retrieve data or to update database 504 on DBMS 502.

Similarly, regional data center 536 in FIG. 5 can be used to provide distributed database services for client systems 538 and 540. Clients 538 and 540 may access regional data center 536 via network 535 as shown in FIG. 5. This configuration could be used to provide redundancy or to reduce network traffic thereby increasing performance and efficiency for application server 542. As described above, application server 542 includes a modified client API for directing client requests to RSU 544 via the resource abstraction layer embedded in the modified driver. And, as described above, RSU 544 fulfills the client requests using cache database 546 which is updated as needed.

In order to process updates and maintain transaction consistency for database applications, a distributed database system according to the present invention may employ specialized methods for processing transactions. The present invention introduces novel methods for providing distributed transaction support in a manner consistent with current non-distributed database management systems. Methods are described herein to support three transaction isolation levels in cases A, B and C.

Case-A: "Read Committed" Transaction Isolation is Requested by the User

Figure 6A:
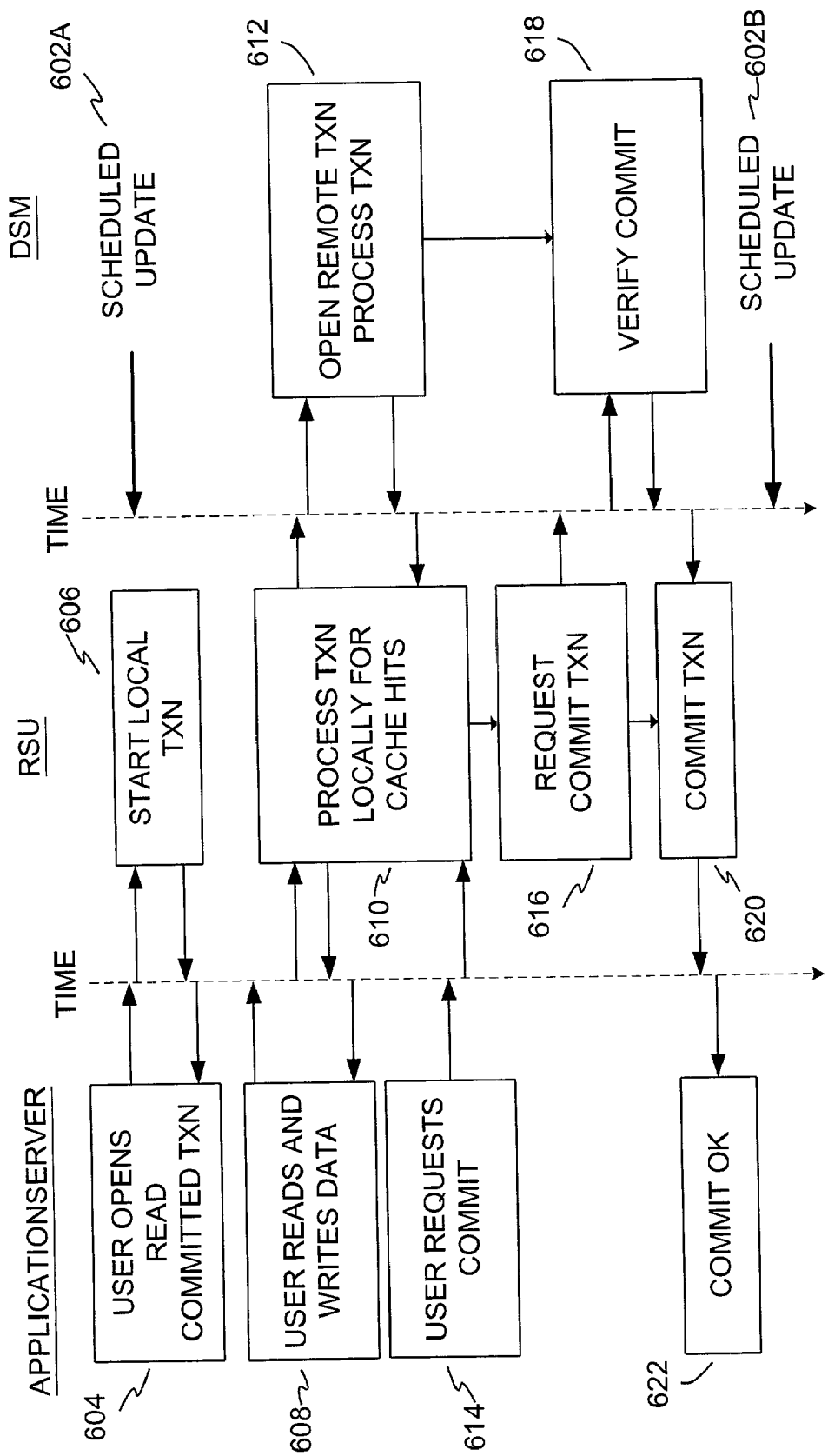
FIG. 6A is a transaction processing timeline for maintaining database consistency in an embodiment of the present invention.

FIG. 6A depicts the complete transaction process using a timeline to show interaction between each of the participating systems, application server 410, Remote Server Unit 420 and Database Subscription Manager 440. Transaction is shortened to "TXN" in the diagram. When the user opens a transaction with Read Committed isolation specified in step 604, the RSU starts the local transaction on Cache database 424 and sends a message to the application server that the local transaction is open in step 606. The user then reads and writes data in step 608 by sending read and write operations to the RSU. In step 610 the RSU processes the transactions locally when the data is available in Cache database 424. Those requests that can not be fulfilled locally using the data in Cache database 424 are sent to the DSM, where a remote transaction is opened on receipt of the first request for read or write in step 612. The requested data is obtained by the DSM from DBMS server 450 and then sent to the RSU to fulfill the read and write requests that were not able to be fulfilled by the Cache database 424. When the user is finished with the reads and writes, he requests a commit in step 614 through the application server The commit request is received by the RSU, which may initiate a commit request 616 to the DSM, which then processes the commit on the DBMS server in step 618 and sends a message to the RSU in step 620 on completion. In some cases, a conflict will arise on the DBMS server, such as an attempt to update a row locked by another transaction on the DBMS server. In these cases, Commit verifier 444 will issue a "rollback" message to the RSU, which will then send a rollback message to the application server to complete the user transaction. For enhanced performance, the RSU can bypass step 618 on the DSM and the associated messaging by verifying that no writes were performed in the transaction in step 616, then returning a successful commit message to the application server in step 620. The transaction is successfully completed when step 622 is executed on the application server.

Case-B: "Repeatable Read" Transaction Isolation with "Read-Only" Access is Requested by the User A "timestamp" message is delivered along with updated data entries from the DSM to all RSUs, shown as process 602A and 602B in FIG. 6A. The update messages occur on a schedule, and are sent whether or not the content of the updates for each RSU are empty. The content of the timestamp message is the current value of the sequential count of transactions on the DBMS. This number is maintained and made available by many commercially available database management systems that use Multiple Version Concurrency Control, including Oracle™ and PostgreSQL, which is an open source object-relational DBMS widely-available on the Internet. When timestamp messages are received by the RSU the timestamp is stored. The remainder of the transaction is processed the same as in Case-A, with the following differences: 1) the local transaction is opened with serializable or repeatable read transaction isolation, which will ensure that data read from the cache database will be consistent with the latest update from the DBMS server, 2) the value of the timestamp from the start of the local transaction is stored, 3) when user queries require the use of data from the DBMS, they are processed by sending the timestamp value of the transaction to the DBMS server along with the query, which is used by the DBMS server to view data at that point in time. This is done on the DBMS server by using a "snapshot" or "flashback" query, which is a feature of many commercial database systems such as Oracle. Using the process described above, the contents of the cache database and the DBMS server are assured to be read from a consistent single point in time, which establishes the required Repeatable Read transaction isolation level.

Case-C: "Serializable" Transaction Isolation is Requested by the User

Figure 6B:
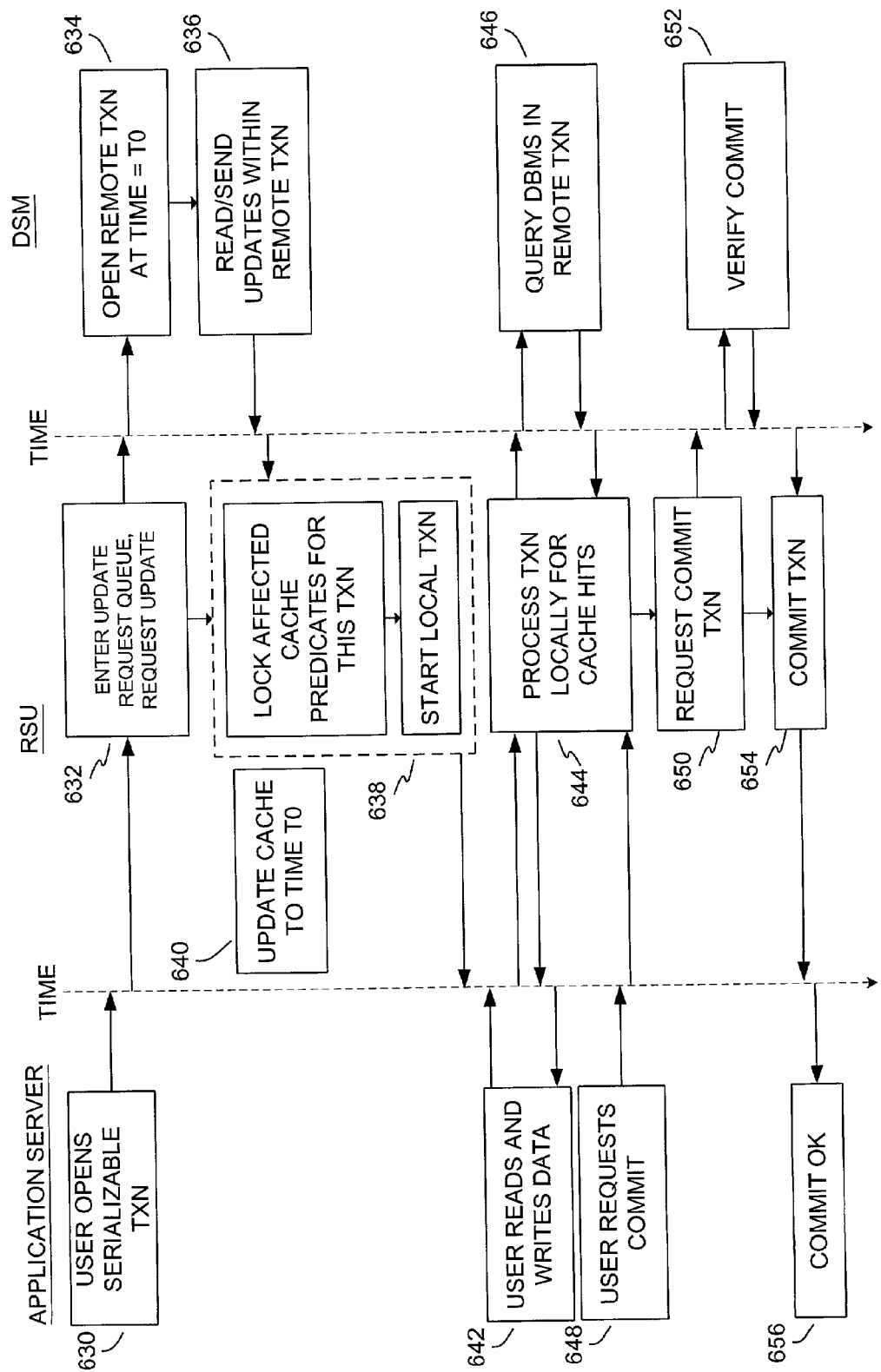
FIG. 6B is a transaction processing timeline for maintaining database consistency in an embodiment of the present invention.

The complete transaction process is shown in FIG. 6B, using timelines again to visualize the actions of the participants. The application server sends a message to the RSU to open the transaction in step 630, and then the RSU places a new entry in a local Update Request Queue in step 632. It also sends a request for an update to the DSM in step 632, which opens a remote transaction with serializable transaction isolation in step 634. The DSM then initiates an update to the RSU, where the data required for the update are read within the remote transaction in step 636, which ensures proper time synchronization.

The two steps within the dashed box 638 are done as an atomic, serialized operation on the RSU. This can be accomplished using a simple FIFO (First In First Out) queue to hold the update requests, and when each update request is processed, both steps are completed before de-queuing the request. In addition, step 638 is processed after all previously queued update requests. The update step 638 begins by receiving the updates from the DSM. It initiates a separate, concurrent process that starts to implement the updates into the Cache database (step 640). It then scans the update message from the DSM for predicates that are contained in the cache database and marks each of those to prevent their use by the transaction associated with the update request. It then opens a local transaction with serializable isolation, which completes step 638. After step 638 is completed, the remote transaction and the local transaction are synchronized to the same point in time, and all read and write requests to the Cache database and to the DBMS server will conform to the required serializable transaction isolation level.

A modification to Case C described above, allows a slight relaxation of time consistency in exchange for dramatically enhanced performance, while preserving serializability of transactions. A pool of transactions is opened on the central DBMS server and a list of open transactions is maintained by the DSM over a fixed, small time period. The DSM divides the list into a group for each RSU, then sends each RSU open transactions it can use along with updates that update the RSU cache to the point in time of each open transaction. The DSM processes notifications for each update period in this case by using the procedure illustrated in FIG. 7.

Figure 7:
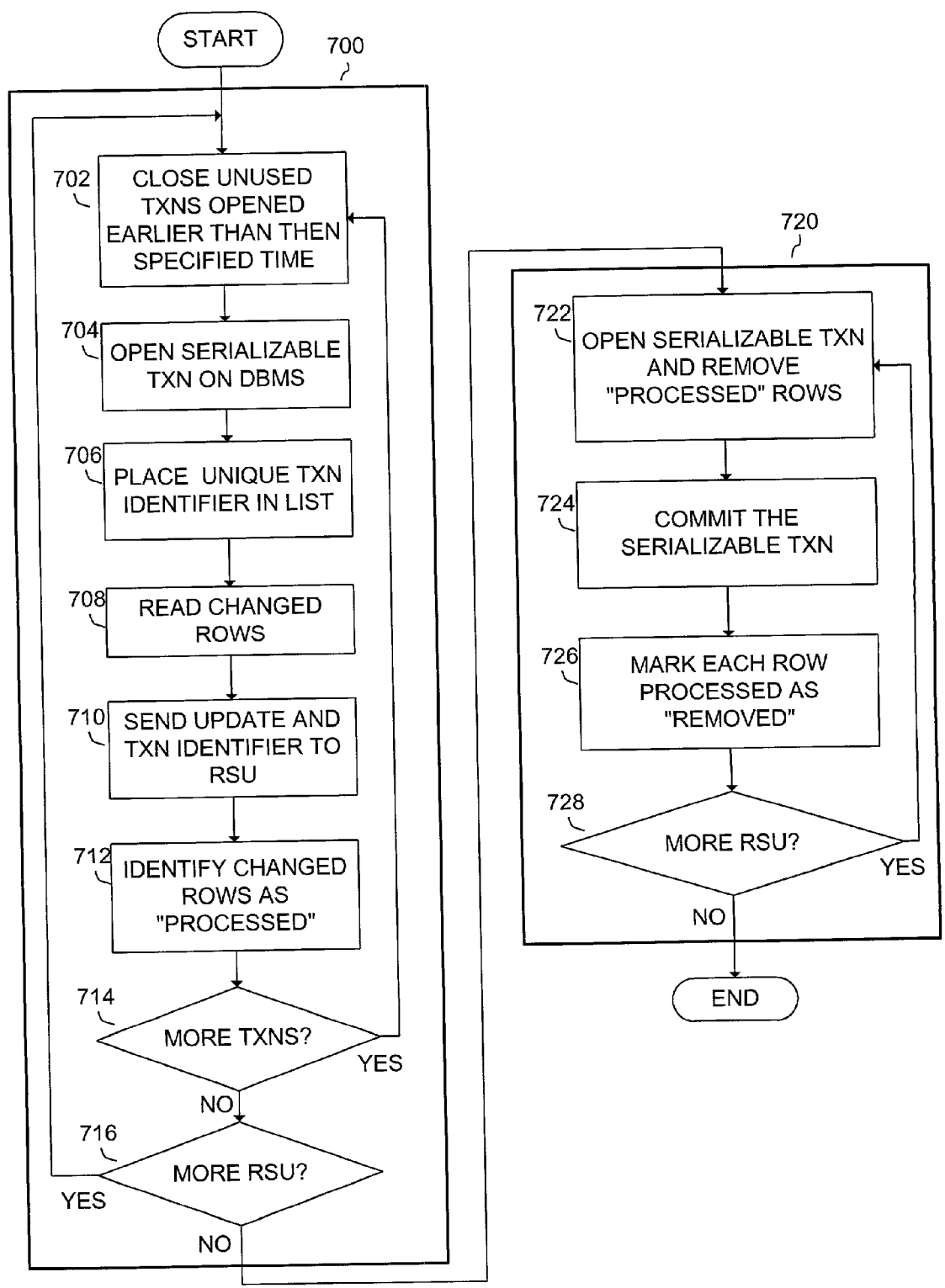
FIG. 7 is a flow diagram showing the steps used to process notification messages in an embodiment of the present invention.

As shown in FIG. 7, the procedure is a two-part process. The first part of the procedure is shown in box 700 and the second part is shown in box 720. As shown in box 700, steps 702–714 are repeated for each transaction processed on the DSM. Moreover, steps 702–716 are repeated for each RSU.

In step 702 any unused transactions opened earlier than a specified time are closed on the DSM. Next, in step 704, the DSM opens a serializable remote transaction on the DBMS server. In step 706, the DSM places a unique transaction identifier into a list of transaction identifiers for later use by the RSU. In step 708, changed rows are read from the DBMS server within the remote transaction. In step 710, the update package is sent to the RSU along with the transaction identifier. Finally, in step 712, the DSM identifies each changed row as "processed" in a data structure. In step 714, the DSM checks to see if there are more transactions to be opened for the particular RSU. If there are more transactions, the process repeats steps 702–712. Otherwise, if there are no more transactions to be processed, the DSM moves to step 716. In step 716, the DSM checks to see if there are more RSUs to be updated. If so, the DSM repeats steps 702–714 for the next RSU to be updated. Otherwise, if there are no more RSUs to be updated, the DSM moves on to the second part of the procedure (i.e., box 720).

The steps shown in box 720 are repeated for each RSU. In step 722, the DSM opens a serializable transaction and removes the rows identified as "processed" and not "removed" in step 710. In step 724, the DSM commits the serializable transaction, and in step 726, the DSM marks each row processed in step 722 as "removed." In step 728, the DSM checks to see if there are more RSUs to be processed. If so, the DSM repeats steps 722–726 for the next RSU to be processed. Otherwise, if there are no more RSUs to be processed, the procedure is complete.

The RSU receives an update message with a single remote transactions associated with it. It then opens a serializable local transaction, updates the cache database using the data in the update message and then enters the local transaction into a list of available transactions. If a user subsequently starts a serializable transaction on the RSU, they are assigned an open transaction from the pool of waiting local transactions. Using the previously opened local transaction, the user is able to read and write to the cache at a point in time synchronized with the central DBMS server, without having to communicate with the central DBMS server. When the users starts a commit, the RSU sends an update message to the DSM containing any updated data. The DSM uses the waiting remote transaction to process the updates with the central DBMS server. Update collisions on the central DBMS are handled by issuing a rollback to the user. If the waiting remote transaction remains unused for a fixed period of time, the DSM rolls back the unused remote transaction.

The present invention enables the "pooling" of transactions on the central DBMS server and on the distributed cache databases in order to expedite and scale up the remote processing of serializable transactions. The trade-off for enhanced performance is that within a specified period of "pool activity time" (perhaps thirty seconds), a user's transaction will occur at a randomly distributed period in the past, with an expected mean time equal to one half of the specified pool activity time (perhaps fifteen seconds).

The foregoing disclosure of embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A distributed database caching system for processing transactions between an application server and a central DBMS server, the system comprising:
   a resource abstraction layer on the application server; and
   a remote server unit in communication with the application server and a database subscription manager, wherein the remote server unit includes a cache DBMS server to manage a cache database, and wherein the database subscription manager is in communication with the central DBMS server,
   wherein the application server sends queries for a plurality of users to the remote server unit via the resource abstraction layer,
   wherein the remote server unit processes each query through the cache DBMS server, and wherein the cache DBMS server checks a data structure consisting of subscribed query predicates, and wherein, if the query is contained within prior query predicates, the remote server unit sends local query results derived from the cache database to the application server, and wherein if the query is not contained within subscribed predicates, the remote server unit sends the query to the data subscriber manager, wherein the database subscription manager retrieves a result from the central DBMS server, and wherein the database subscription manager derives query results from the central DBMS server, and wherein the database subscription manager sends the query results to the remote server unit, and creates a subscription to the query predicate on behalf of the remote server unit, wherein the query results are added to the cache database and the query predicate is added to the query predicate data structure on the remote server unit, completing a subscription to that query predicate.

2. The system of claim 1, wherein the resource abstraction layer is embedded in a database application programming interface.

3. The system of claim 2, wherein the database application programming interface is a JDBC client driver.

4. The system of claim 2, wherein the database application programming interface is a ODBC client driver.

5. The system of claim 1, wherein the resource abstraction layer comprises a distribution policy, wherein the distribution policy directs the queries to one of a plurality of remote server units.

6. The system of claim 5, wherein the plurality of remote server units are housed in a data center with the application server and the DBMS server.

7. The system of claim 5, wherein the plurality of remote server units are housed in a data center apart from the application server and the DBMS server.

8. The system of claim 5, wherein a first portion of the plurality of remote server units are housed in a data center with the application server and the DBMS server, and wherein a second portion of the plurality of remote server units are housed in a location geographically remote from the data center.

9. The system of claim 1, wherein the remote server unit further comprises:
 a database server driver comprising a database listener function, a query parser function and a database query fulfillment function; and
 a query execution manager comprising a query execution function, and wherein the database listener function receives the queries from the application server and passes the queries to the query parser function, and wherein the query parser function parses the queries into structured query language queries and passes the structured query language queries to the query fulfillment function, and wherein the query fulfillment function interacts with the query execution function to obtain the result from the cache DBMS server.

10. The system of claim 9, wherein the cache DBMS server comprises a cache manager function, a cache description handler function, a cache containment function, a notification processor, and a space manager, wherein the cache manager function interfaces with the query parser function and the cache containment function to determine whether the structured query language queries can be satisfied from the cache DBMS server, and wherein the cache description handler updates the subscribed query predicates and provides a predicate usage information to the space manager, and wherein the notification processor receives notification messages from the database subscription manager and propagates an effect of the notification messages to a cache database on the cache DBMS server.

11. A distributed database caching system for processing transactions between an application server and at least one central DBMS server, the system comprising:
 a modified database client driver on the application server, wherein the modified database client driver includes a resource abstraction layer;
 an application logic on the application server, wherein the application logic sends a user inquiry to the modified database client driver for processing and wherein the application logic receives a result from the modified database client driver; and
 at least one remote server unit in communication with the application servr and at least one database subscription manager, wherein the remote server unit includes a modified database server driver, a cache DBMS server, and a query engine, and wherein the cache DBMS server includes a cache database and a data structure containing currently subscribed query predicates, and wherein the at least one database subscription manager is in communication with the least one central DBMS server,
 wherein the resource abstraction layer receives the user inquiry from the modified client database driver and sends the user inquiry to the modified server database driver on the at least one remote server unit,
 wherein the modified server database driver sends the user inquiry to the cache DBMS server and wherein the modified server database driver receives the result from the cache DBMS server,
 wherein the cache DBMS server uses the query engine to check the predicate data structure for a locally contained result, and wherein, if the local result exists, the cache DBMS server sends the local query result to the modified server database driver as the result, and wherein if the local result is nonexistent, the cache DBMS server sends the user inquiry to the at least one data subscription manager,
 wherein the at least one database subscription manager retrieves the result from the at least one central DBMS server, and wherein the at least one database subscription manager derives a plurality of predicates from a plurality of user inquires processed by the at least one central DBMS server, and wherein the at least one database subscription manager sends the plurality of predicates the cache DBMS server for updating the cache database.

12. A method of processing a transaction between an application server and a central DBMS server, the method comprising:
 sending the transaction from the application server to a remote server unit, wherein the transaction is sent via a resource abstraction layer on the application server;
 determining whether a local result exists in a cache database on the remote server unit;
 sending the local result from the remote server unit to the application server if the local result exists;
 sending the transaction from the remote server unit to a data subscriber manager if the local result does not exist, wherein the database subscription manager retrieves a result from the central DBMS server;
 deriving on the database subscription manager a plurality of predicates from a plurality of transactions processed by the central DBMS server;

sending the plurality of predicates from the database subscription manager to the remote server unit; and updating the cache database according to the plurality of predicates.

13. A method of implementing serializable transaction isolation in a distributed database caching system in communication with a central DBMS server, the method comprising;

opening a serializable transaction on an application server;

placing an entry into a local update request queue on a remote server unit;

opening a remote transaction on a central DBMS server using a database subscription manager in response to an update request from the remote server unit;

sending a plurality of updates from the database subscription manager to the remote server unit using data obtained from the central DBMS server;

processing the plurality of updates in a serialized manner on the remote server unit by checking the plurality of updates to identify predicates in the cache database, locking the predicates in the cache database, and starting a local transaction on a remote server unit; thereby synchronizing the remote transaction and the local transaction.

14. A method of implementing read committed transaction isolation in a distributed database caching system in communication with a central DBMS server, the method comprising:

opening a read committed transaction on an application server;

starting a local transaction on a remote server unit;

receiving a user request on the remote server unit;

opening a remote transaction on a central DBMS server using a database subscription manager in response to a data request from the remote server unit, wherein the data request is based on the user request;

sending a result from the database subscription manager to the remote server unit using data obtained from the central DBMS server;

sending the result from the remote server unit to the application server;

receiving a commit request on the remote server unit from the application server;

sending the commit request to the database subscription manager; and verifying a successful outcome for the commit request.

15. The method of claim 14, wherein the read committed transaction comprises a repeatable read transaction, and wherein the method further comprises sending plurality of timestamp messages from the data management unit to the remote server unit on a periodic basis, wherein the remote server unit synchronizes with the central DBMS using the timestamp of the remote server unit transaction to process data requests on the central DBMS.

16. A method of implementing serializable transaction isolation in a distributed database caching system in communication with a central DBMS server, the method comprising:

opening a pool of serializable transactions on the central DBMS server;

associating each pooled transaction with updated information on the central DBMS server, sending the updated information and an identifier for each pooled transaction to a remote server unit, opening a serializable transaction on the remote server unit and processing the updated data associated with it, using the open serializable transactions opened on the remote server unit and the central database server to process read and write requests to the remote server unit, processing a final transaction commit on the central DBMS server, sending one of a rollback or a successful commit message to the remote server unit.

* * * * *